United States Patent
Detken et al.

(10) Patent No.: US 11,281,676 B2
(45) Date of Patent: Mar. 22, 2022

(54) TIME-BASED DISPLAY OF SEARCH RESULTS

(71) Applicant: SAP SE, Walldorf (DE)

(72) Inventors: Karen Detken, Heidelberg (DE); Jackson Mathai, Heidelberg (DE)

(73) Assignee: SAP SE, Walldorf (DE)

( * ) Notice: Subject to any disclaimer, the term of this patent is extended or adjusted under 35 U.S.C. 154(b) by 836 days.

(21) Appl. No.: 14/847,088

(22) Filed: Sep. 8, 2015

(65) Prior Publication Data
US 2017/0068673 A1  Mar. 9, 2017

(51) Int. Cl.
*G06F 16/2457* (2019.01)

(52) U.S. Cl.
CPC ............... *G06F 16/24578* (2019.01)

(58) Field of Classification Search
CPC ............ G06F 17/3053; G06F 16/24578
USPC ................................................. 707/767
See application file for complete search history.

(56) References Cited

U.S. PATENT DOCUMENTS

| | | | |
|---|---|---|---|
| 8,627,195 B1* | 1/2014 | Hayden | G06F 17/30873 715/229 |
| 9,639,524 B2* | 5/2017 | Allen | G06F 16/2477 |
| 2009/0276724 A1* | 11/2009 | Rosenthal | G06F 3/0482 715/771 |
| 2014/0236939 A1* | 8/2014 | Wirtz | G06F 17/30867 707/728 |
| 2014/0365518 A1* | 12/2014 | Calo | G06F 17/30401 707/760 |
| 2015/0106448 A1* | 4/2015 | Ownbey | H04W 4/02 709/204 |
| 2015/0169178 A1* | 6/2015 | Wang | G06F 3/04817 715/765 |
| 2016/0034565 A1* | 2/2016 | Bastide | G06F 16/24522 707/749 |

* cited by examiner

*Primary Examiner* — Alford W Kindred
*Assistant Examiner* — Allen S Lin
(74) *Attorney, Agent, or Firm* — Buckley, Maschoff & Talwalkar LLC

(57) ABSTRACT

A system receives a query and an information space is queried based on the query. Results of the query of the information space are received and each of the results is associated with a respective time period. Each of a plurality of pictograms representing one or more results that are associated with the respective time period is determined. The plurality of pictograms are displayed in a linear progression and in chronological order with respect to one another based on their respective time periods.

20 Claims, 12 Drawing Sheets

TIME-BASED DISPLAY OF SEARCH RESULTS

BACKGROUND

A user may utilize a search engine to search for data associated with a topic and with a defined time period. The search engine returns search results, which are typically presented in a list format and include hyperlinks to their respective sources. In the case of long time periods and/or broad topics, the search engine may return an extremely large number of search results.

Such a large number of returned search results can be overwhelming, hard to understand, and difficult to organize. In this regard, a user is forced to manually scan individual search results in order to extract required information and is provided with no guidance as to how the different results relate to one another.

DETAILED DESCRIPTION

The following description is provided to enable any person in the art to make and use the described embodiments and sets forth the best mode contemplated for carrying out some embodiments. Various modifications, however, will remain readily apparent to those in the art.

The present embodiments relate to the visualization of a chronological timeline of events associated with a topic. Such a timeline may relate to any topic, such as, but not limited to, a person, a company, a historical period or a product. For example, if the topic is a person, an event may comprise the person's death, the person's birth or an achievement by the person. If, for example, the topic is a company, an event may comprise a founding of the company, an important development by the company, or a development which led to the company's demise.

The timeline may be referred to as a time snap. To create a time snap, a time snap engine may search various sources for events related to a given topic, evaluate the results and extract data about the events.

Figure 1:
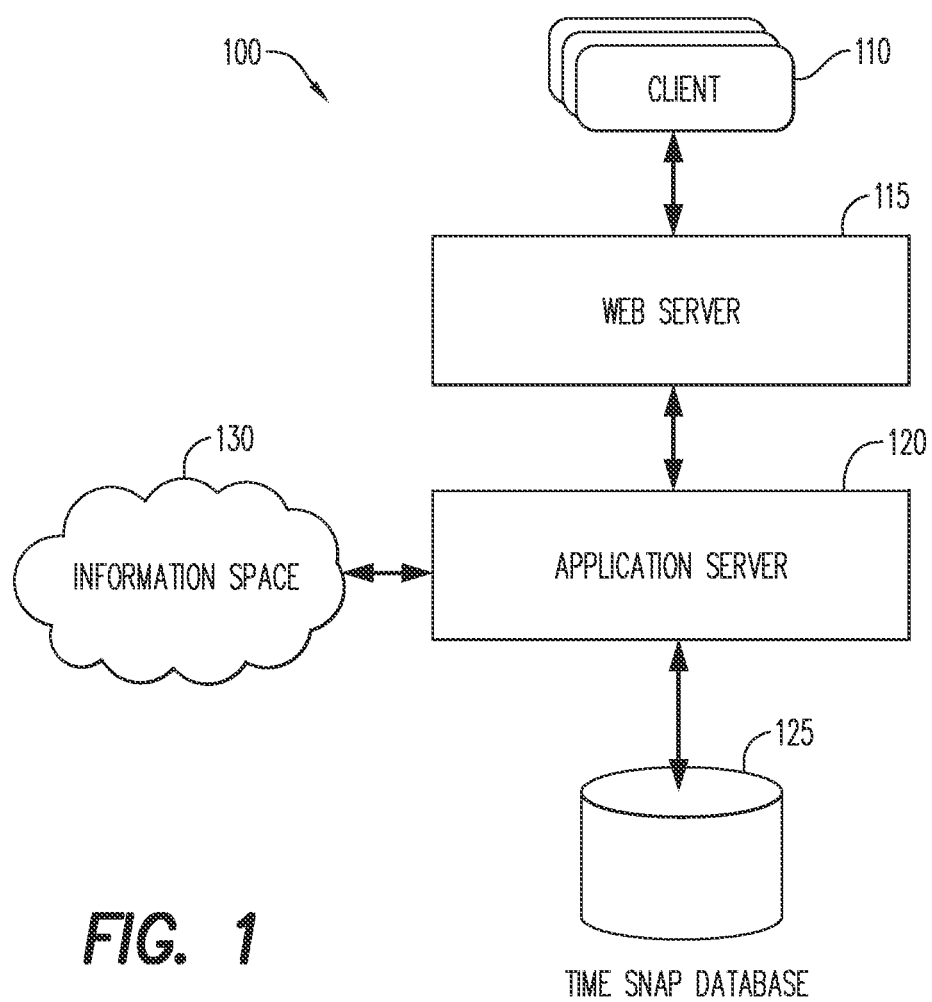
FIG. 1 is a block diagram of a system according to some embodiments.

FIG. 1 is a block diagram of system 100 according to some embodiments. System 100 includes a client 110, a web server 115, an application server 120 and a database 125. Generally, the client 110 requests and receives data via the web server 115. More particularly, the web server 115 may act as a front-end for the application server 120 to read data from and write data to the database 125.

The database 125 may comprise any query-responsive data source or sources that are or become known, including but not limited to a structured-query language (SQL) relational database management system. Data stored in the database 125 may be stored as part of a relational database, a multi-dimensional database, an eXtendable Markup Language (XML) document, or any other data storage system storing structured and/or unstructured data. The data may be distributed among several relational databases, multi-dimensional databases, and/or other data sources. In some embodiments, the database 125 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources.

The client 110 may comprise one or more devices executing program code for presenting user interfaces to allow interaction with the web server 115. Presentation of a user interface may comprise any degree or type of rendering. For example, the client 110 may execute a web browser to receive a web page (e.g., in HTML format) from the web server 115, and may render and present the web page according to known protocols. Each client 110 may also, or alternatively, present user interfaces by executing a stand-alone executable file (e.g., an .exe file) or code (e.g., a JAVA applet) within a virtual machine.

The web server 115 may comprise a computing device that processes requests using a computer processor. For example, the web server 115 may process requests via a Hypertext Transfer Protocol (HTTP) where communication between the client 110 and the web server 115 takes place using HTTP. The web server 110 may also support server-side scripting using Active Server Pages (ASP), Personal Home Page (PHP), or other scripting languages.

The information space 130 may comprise one or more searchable domains such as, but not limited to, the internet, a library, or any searchable domain that comprises material such as articles, web logs, books, letters, web pages, etc. Event data contained within the information space 130 may be located in a single document or in multiple documents which may be found within the information space 130.

The application server 120 may comprise a computing device that provides a framework to create applications and/or act as an environment to execute the applications. The application server 120 may provide data to the client 110 in response to requests received therefrom via the web server 115. The application server 120 may function as a search engine to retrieve data from the information space 130, and in some embodiments, the application server 120 may also function as a time snap engine to evaluate the retrieved data and extract event information from the retrieved data. The application server 120 comprises various components which will be discussed in more detail with respect to FIG. 12.

Figure 2:
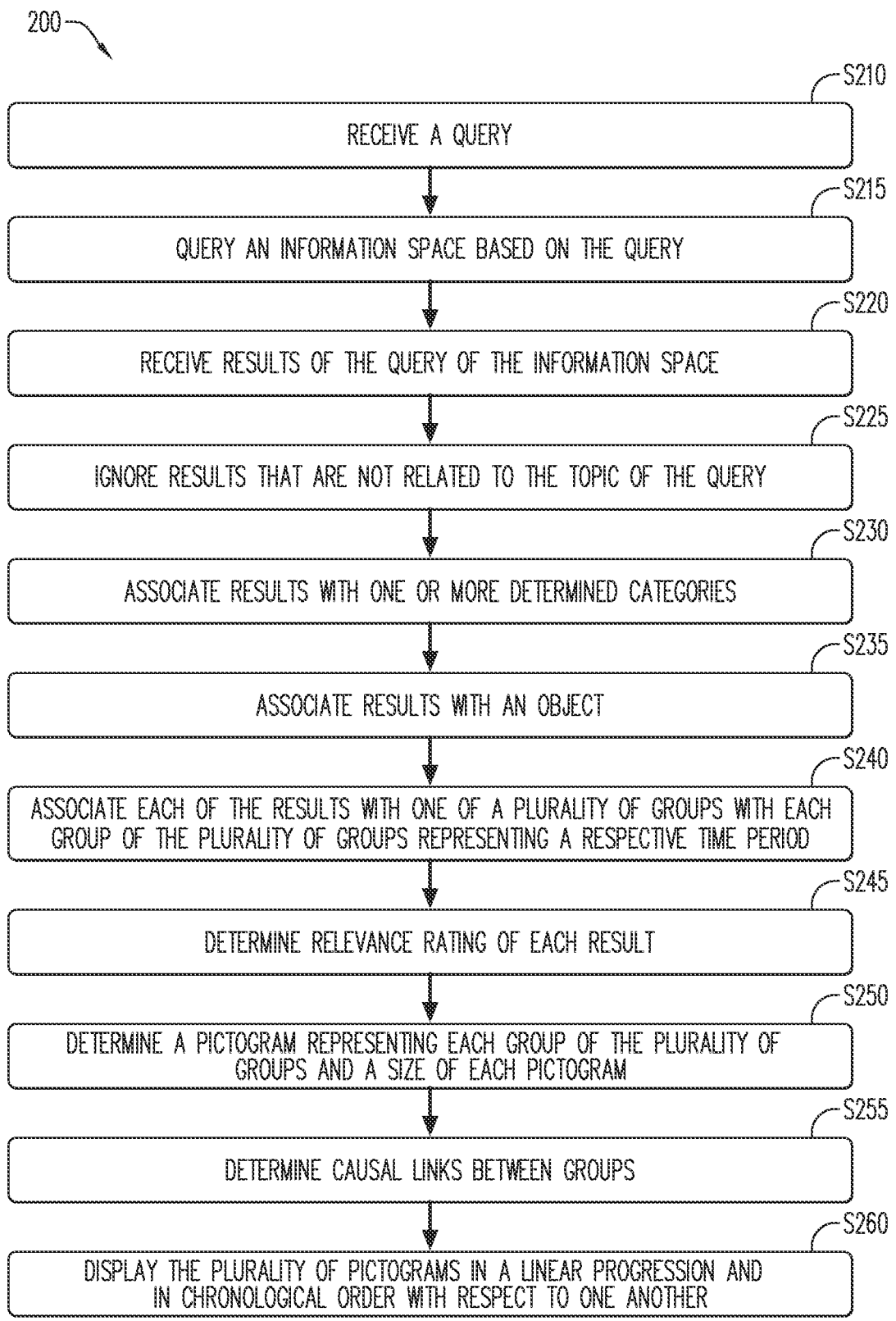
FIG. 2 is a flow diagram of a process according to some embodiments.

FIG. 2 comprises a flow diagram of process 200 according to some embodiments. In some embodiments, various hardware elements of system 100 execute program code to perform process 200. Process 200, and all other processes mentioned herein, may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments.

Although process steps may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

A query is received at S210. The query may relate to a topic to be searched. The query may be received at an application server via a web server. For illustrative purposes, and to aid in understanding features of the specification, an example will now be introduced. This example is not intended to limit the scope of the claims.

Figure 3:
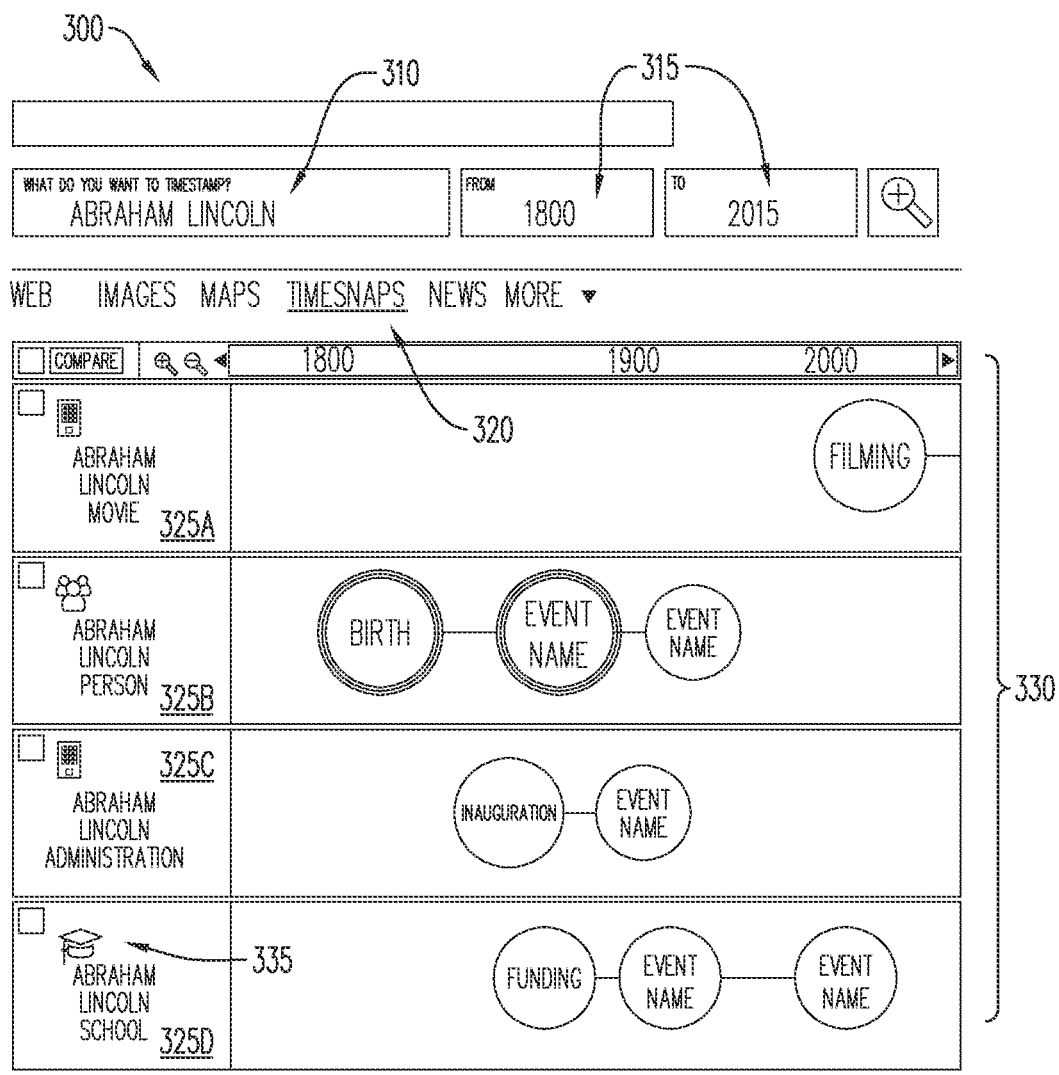
FIG. 3 is web page comprising a query results interface according to some embodiments.

Referring now to FIG. 3, an embodiment of a web page 300 displaying results of a query related to "Abraham Lincoln" is illustrated. To initiate the query, a user may have entered "Abraham Lincoln" in a search box 310. In some embodiments, the user may also have entered a specified a start time and an end time in input boxes 315.

Referring back to FIG. 2, once the query is received, an information space may be queried at S215. As illustrated in FIG. 3, the information space may be queried for data regarding "Abraham Lincoln".

Results of the query may be received at S220. In some embodiments, the results may comprise snippets. Snippets may comprise portions of articles, web logs, books, letters, web pages, etc. that were determined by a search engine to relate to the topic. Each snippet may be associated with one or more dates, specified in the snippet itself (or its metadata) or based on a context of the snippet. Furthermore, the results may contain metadata about a source of each snippet, such as a domain name or supplemental data that indicates how one event is related to another event (e.g., a first event preceded a second event).

For example, and again referring to FIG. 3, a search for the topic "Abraham Lincoln" may return snippets that were determined by the search engine to be related to "Abraham Lincoln" such as, for example, his birth, his death, his marriage, etc.

However, some results may not be related to the topic and thus may be considered false results. As an illustration, a query for the topic "Lincoln" may return results related to Lincoln, Nebraska or New York's Lincoln Tunnel Therefore, each result may be examined at S225 to determine if the result is related to the topic based on the context of the result. The context of a snippet may include words contained within a snippet or based on metadata related to a source of the result (e.g., webpage content or metadata). If a result of the query is determined to not be related to the query, the result may be ignored at S225.

Each result which is determined to be related to the query may be associated with one or more of a plurality of categories at S230. Categories may be based on the context in which the result was found (e.g., a title of a book or words within a web page from where a snippet was retrieved) or from a list of known categories. The list of known categories may be correlated with a type of subject matter (e.g., categories for people, categories for businesses, categories, for historical events, etc.). In the present example, based on contexts of snippets related to Abraham Lincoln, the results of query related to "Abraham Lincoln" may be associated with categories of a movie, the person (e.g., personal life), the person's job (e.g., the Lincoln Administration), and a school (e.g., Abraham Lincoln High School). Thus, each result may be associated with one or more of the determined categories. Each snippet, its associated categories, date information and other related metadata may be stored in a database such as the database 125 of FIG. 1.

At S235, each of the results may be associated with an object. Each object is associated with a category of the plurality of categories. For example, and in the case of Abraham Lincoln, the results may identify two people associated with Abraham Lincoln: the former President of the United States, as well as Abraham Lincoln Woods, a person who was named after the former president. Each of these people may comprise distinct objects within the category associated with people. In other words, Abraham Lincoln is a first object within the category associated with people and Abraham Lincoln Woods is a second object within the category associated with people.

At S240, and for each object, each of the results may be associated with one of a plurality of groups, with each group of the plurality of groups representing a respective time period. In other words, for each object associated with one of the plurality of categories, one or more results that are associated with (i) the object and (ii) a respective time period are indicated as being part of a group associated with the respective time period. Time periods may be based on time spans such as decades or on custom ranges such as, for example, every five years. Continuing with the above example, Abraham Lincoln, the former President of the United States, lived between 1809 and 1865 and events related to his life may be grouped in 10 year intervals such as 1809-1819, 1819-1829, etc. Each group within a time snap may correspond to a single event related to the object, or may correspond to multiple events.

Determining time periods associated with respective results may be a function of an application server that may search data within an information space and determine dates by not only looking for a date and time associated with a result, but by also analyzing semantics (meanings of words that are being searched) and the context to determine a time period. For example, in a case when a time period associated with a result is not available, a time period may be estimated based on context that describes the result in relation to other results.

At S245, a relevance rating may be determined for each result. The relevance rating of a result may be based on a reliability of a source of the result. For example, the reliability associated with a source of a result may be determined based on how many results (i.e., snippets) have been previously received from the particular source. The more frequently a source has been used for reliable data, the higher the source's relevance may be. Furthermore, in some embodiments, users may pre-select data to be retrieved (e.g., articles, web logs, books, letters, web pages, etc.), which will be discussed in more detail with respect to FIG. 8A and FIG. 8B. Relevance may also be based on a number of users that have pre-selected a particular article, web log, book, letter, or web page from which a snippet is extracted.

A pictogram representing each group of the plurality of groups, and a size of the pictogram representing each group, may be determined at S250. The size of a pictogram representing a group may be based on a relevance of the group. Relevance of the group may be based on various factors such as, but not limited to, a total relevance of all results within the group, an average of the relevance of results within the group, or on a highest relevance of a single result within the group. Relevance may also be determined by temporarily eliminating a result from a linear progression to be and then determining an impact of the elimination. The greater the impact, the higher the relevance rating of the result. In some embodiments, pictograms may be visually enhanced based on a number of results being represented by each pictogram. Visual enhancement of pictograms will be described in more detail with respect to FIG. 4.

Pictograms may be linked by a chronological indicator which illustrates that the results associated with a first pictogram are associated with a time period prior to the time period associated with the results of a second pictogram. Chronological placement may be determined by comparing the results associated with a pictogram and applying a sequence index identifier to each pictogram.

In some instances, a first group of results has a causal relationship with a second group of results. For example, results associated with the Abraham Lincoln's presidential debates in 1858 may be in a first group and may also have a causal relationship with results associated with Lincoln being elected president in 1860 which may be in a second group. Causal relationships may be determined by information contained within the context of snippets or other searchable material. In cases where a first result has a causal relationship with a result in a different time period (e.g., the results are in two different groups), a causal indicator may be used to link corresponding pictograms. Causal links between pictograms may be determined at S255 and pictograms associated with causal links may be marked as such.

Flow proceeds to from S255 to S260, where the plurality of pictograms may be displayed in a linear progression and in chronological order with respect to one another. Causal links determined at S255 may be added to the linear progression. The plurality of pictograms may be displayed in a linear progression and in chronological order within a query results interface. Continuing with the example from FIG. 3, the user may choose to view the results of the search as images, maps, or linear progressions (i.e., time snaps 320). Since time snaps 320 have been selected, the user may be presented a query results interface 330 comprising four different sets of pictograms with each set being displayed in a linear progression and in chronological order 325A/325B/325C/325D. The four time snaps may be related to, respectively, the categories Abraham Lincoln the movie 325A, Abraham Lincoln the person 325B, Abraham Lincoln the administration of 325C, and Abraham Lincoln the school 325D. Each set of pictograms may represent the search results as well as the subject matter of the search. As illustrated, the linear progressions may be a horizontal progression with respect to a display screen. The query results interface 330 will be discussed in more detail with respect to FIG. 4.

Figure 4:
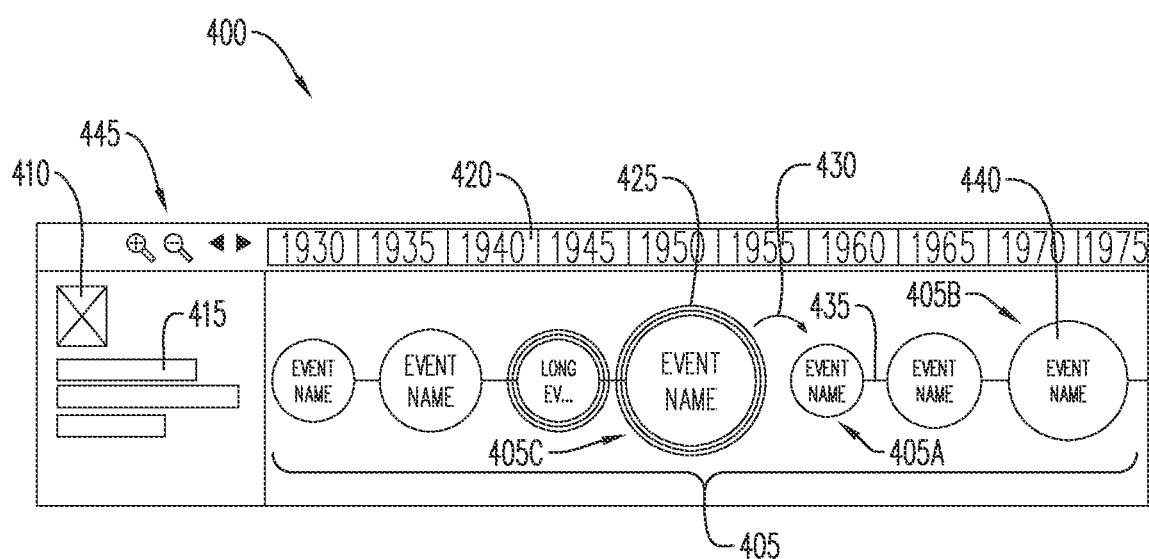
FIG. 4 is a query results interface according to some embodiments.

Now referring to FIG. 4, an embodiment of a query results interface 400 is illustrated. The query results interface 400 may display a plurality of pictograms in a linear progression and in chronological order with respect to one another based on their respective time periods (e.g., a timeline 405). As illustrated in FIG. 4, the query results interface 400 comprises a timeline 420 indicating ranges of years and each pictogram may be provided an event name 440 based on the group of results represented by the pictogram. In some embodiments, a most common phrase or term taken from the group of results may be used as an event name 440. The most common phrase or term may be determined from a context of the results that are associated with the pictogram.

As described above, each pictogram may be interconnected using a plurality of connectors 435. As illustrated, connector 435 is a straight line and may indicate a chronological relationship between two pictograms. Connector 430 is a curved line and may indicate a causal relationship between two pictograms. Each pictogram may be sized based on a relevance of the results represented by the pictogram. For example, results represented by pictogram 405B may be more relevant to object 415 than results represented by pictogram 405A and therefore pictogram 405A may be smaller than pictogram 405B.

In some embodiments, a pictogram may be visually enhanced based on a number of results represented by the pictogram. For example, pictogram 405C may be associated with multiple results and pictogram 405A may be associated with a single result and therefore pictogram 405c is encircled by rings.

The query results interface 400 may provide a symbol 410 that relates to a defined type of category associated with the results. For example, and referring to FIG. 3, a symbol representing an educational institution may comprise a square academic cap which is illustrated as symbol 335. The query results interface 400 may also provide a name of the object 415.

The query results interface 400 may provide a zoom feature 445 to allow a user to zoom in or zoom out of the event path 405 that is illustrated as a plurality of pictograms. Using a query results interface, such as the query results interface 400 described above, may facilitate the collection of relevant data about a certain topic and encapsulate the data in an information unit; visualize the information in a chronological framework by identifying its semantics, structure and event information in a chronological order; provide a high level overview of a wide range of data while providing an option to examine event data in more detail; and make a large amount of information visible at a glance by synthesizing relevant keywords (e.g., event names). Based on the foregoing, the present embodiments may reduce the display area required to present time-based search results and organize event-related information.

Figure 5A:
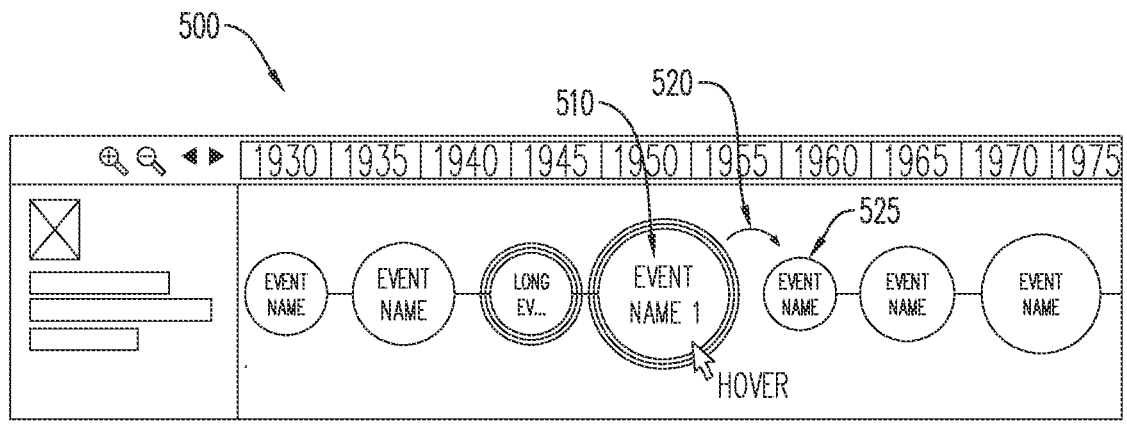
FIG. 5A is a query results interface according to some embodiments.
Figure 5B:
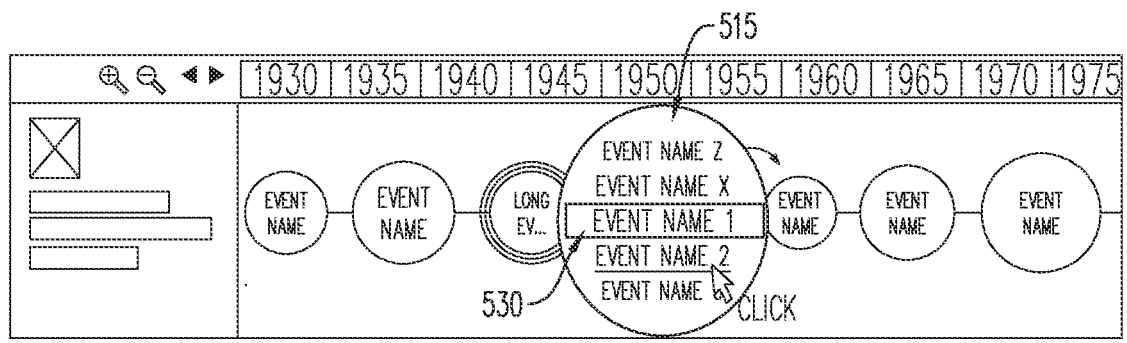
FIG. 5B is a query results interface according to some embodiments.
Figure 5C:
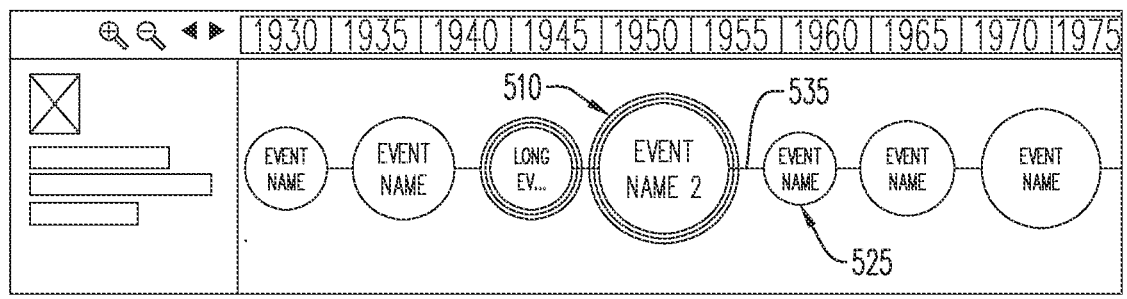
FIG. 5C is a query results interface according to some embodiments.

Referring now to FIG. 5A, FIG. 5B, and FIG. 5C, an embodiment of a query results interface 500 is illustrated. FIG. 5A illustrates pictograms 510 and 525 of a linear progression of pictograms associated with a particular category. Pictograms 510 and 525 each represent search results associated with respective events, and are labeled with text indicating these respective events. Pictograms 510 and 525 are connected by causal connector 520, indicating a causal relationship between their associated events.

The search results associated with pictogram 510 are also associated with a plurality of events. As shown in FIG. 5B, a mouse cursor hovered over pictogram 510 results in display of at least a portion 515 of the plurality of events associated with pictogram 510, along with any associated causal indicators 530. FIG. 5B also illustrates selection of "EVENT NAME 2" from the portion 515.

In response to selection of "EVENT NAME 2", and as shown in FIG. 5C, pictogram 510 is displayed with the label "EVENT NAME 2". Also, because the event "EVENT NAME 2" does not have a causal relationship with the event named on pictogram 525, causal indicator 520 is changed to chronological indicator 535.

Figure 6:
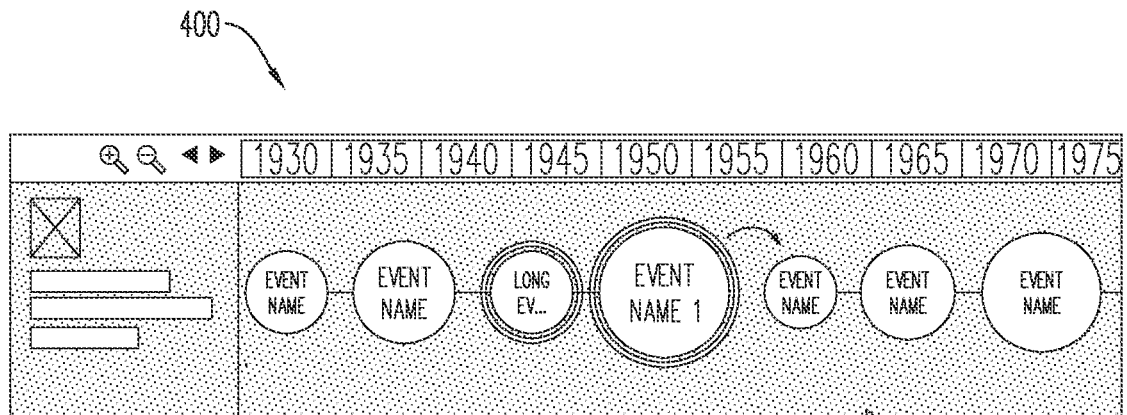
FIG. 6 is a query results interface according to some embodiments.
Figure 7:
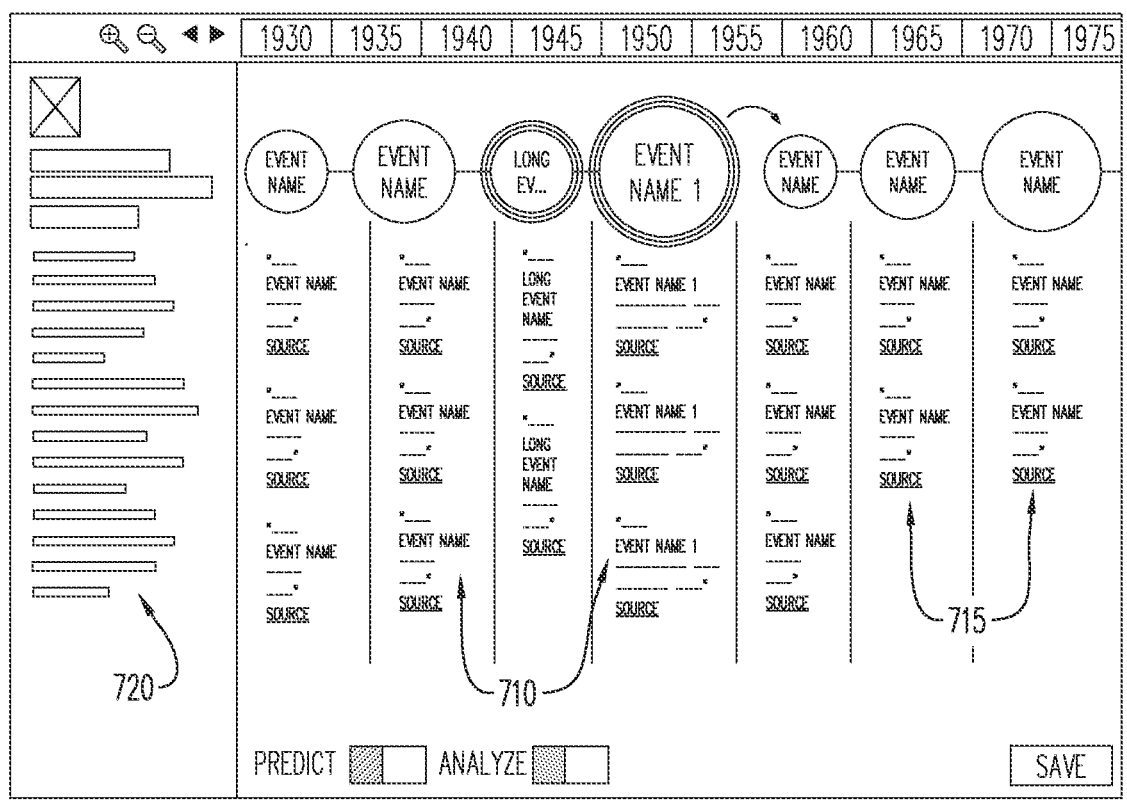
FIG. 7 is an expanded view of a query results interface according to some embodiments.

Referring now to FIG. 6 and FIG. 7, an embodiment of a query results interface 400 and an expanded query results interface 700 is illustrated. In some embodiments, in response to user selection of the event path 405, the query results interface 400 may be expanded to illustrate the search results 710 associated with each pictogram as well as URLs 715 so that a user may navigate to a source of a search result 710. As illustrated, search results 710 and URLs 715 may be displayed in a column format positioned below each respective pictogram so that a user can easily visualize how the search results correspond to each pictogram. Furthermore, the expanded query results interface 700 may provide a detailed summary 720 of the object associated with the event path 405.

Figure 8:
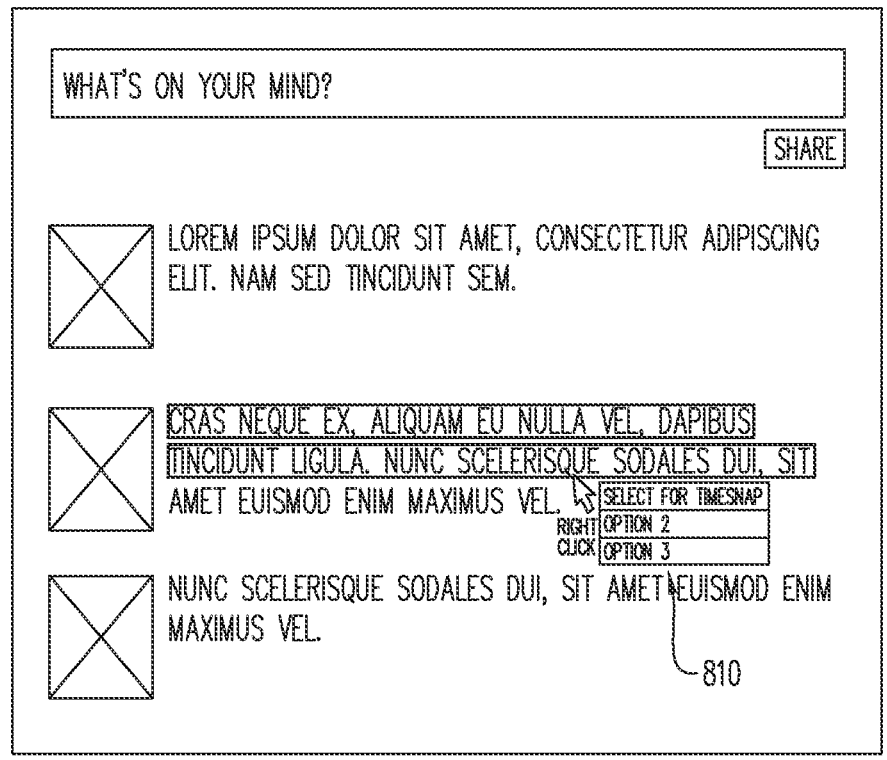
FIG. 8 illustrates a manual selection for a time snap according to some embodiments.
Figure 9:
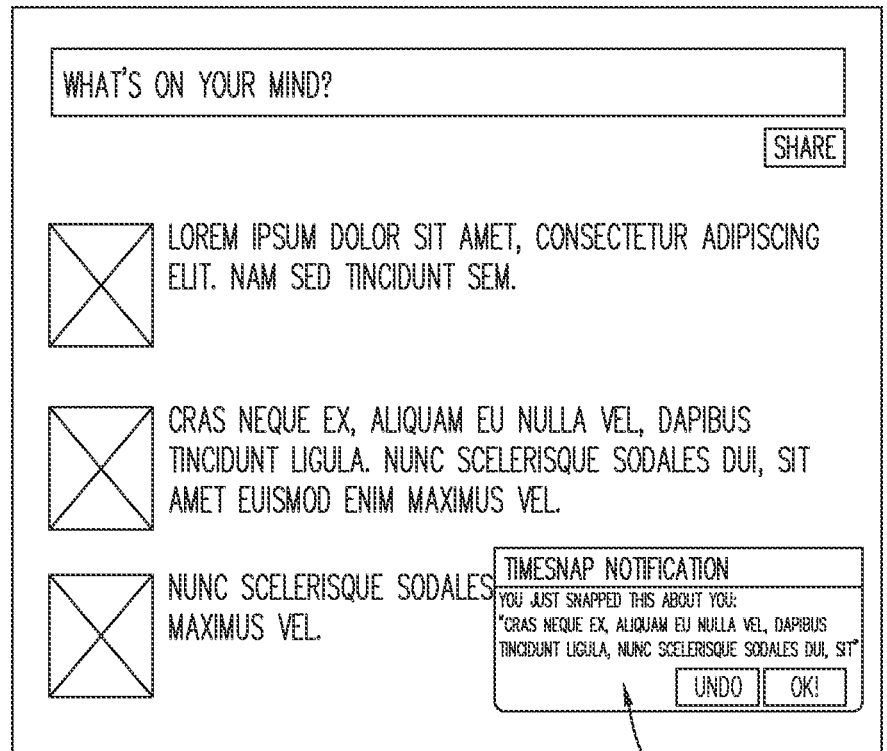
FIG. 9 illustrates a confirmation for a manual selection of a time snap according to some embodiments.

FIG. 8 and FIG. 9 may illustrate a manual method of pre-selecting data to be searched according to some embodiments. For example, if a user is viewing data 800 that he wants included in time snaps, the user may click (or right click) on the data and indicate "select for time snap" 810. The user may receive a notification 820 that the data was selected. Thereafter, when a search engine searches for a topic, the search engine may search this pre-selected data and this data may be displayed in a time snap.

Figure 10A:
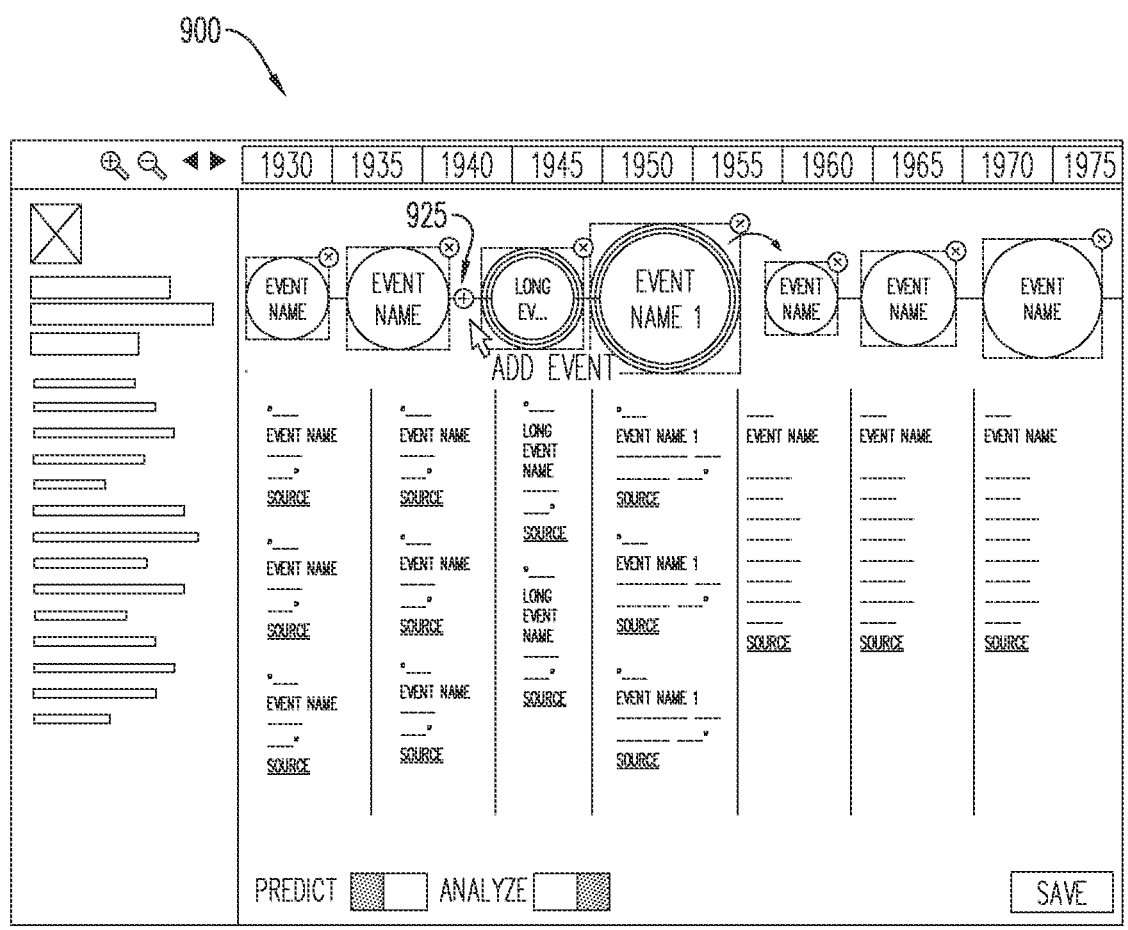
FIG. 10A illustrates adding an event to a query results interface according to some embodiments.
Figure 10B:
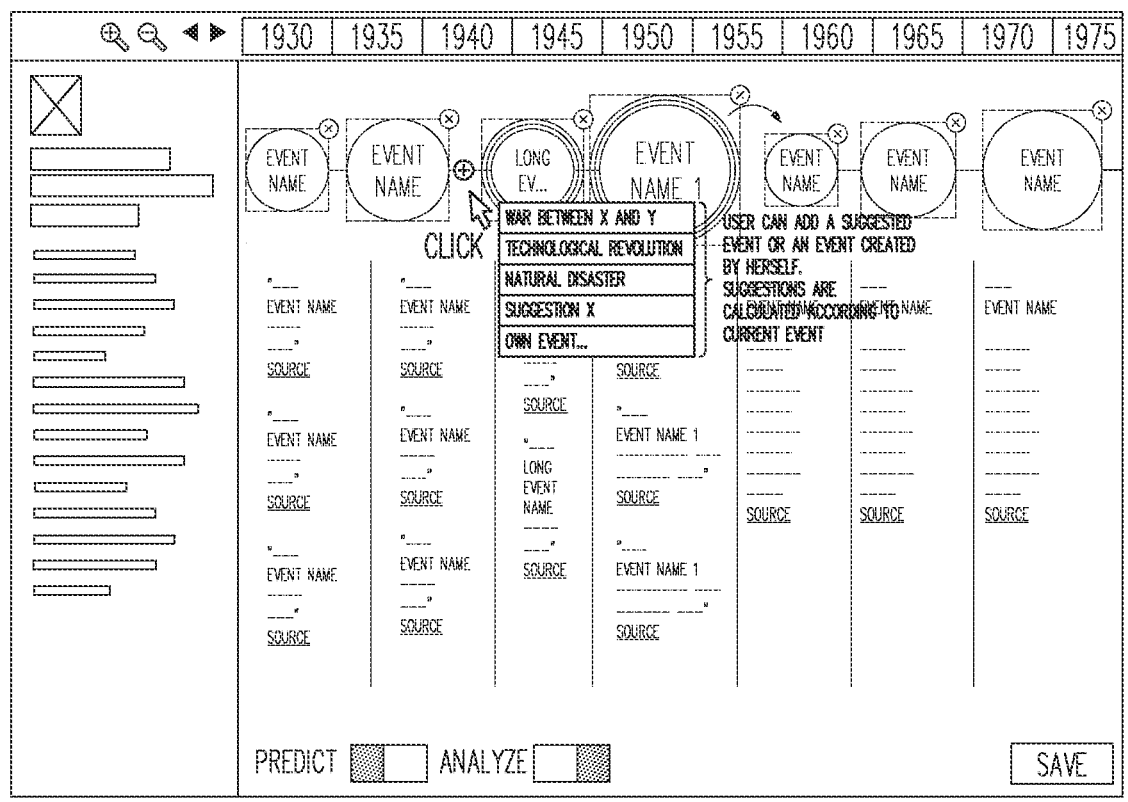
FIG. 10B illustrates options related to adding an event to a query results interface according to some embodiments.
Figure 11:
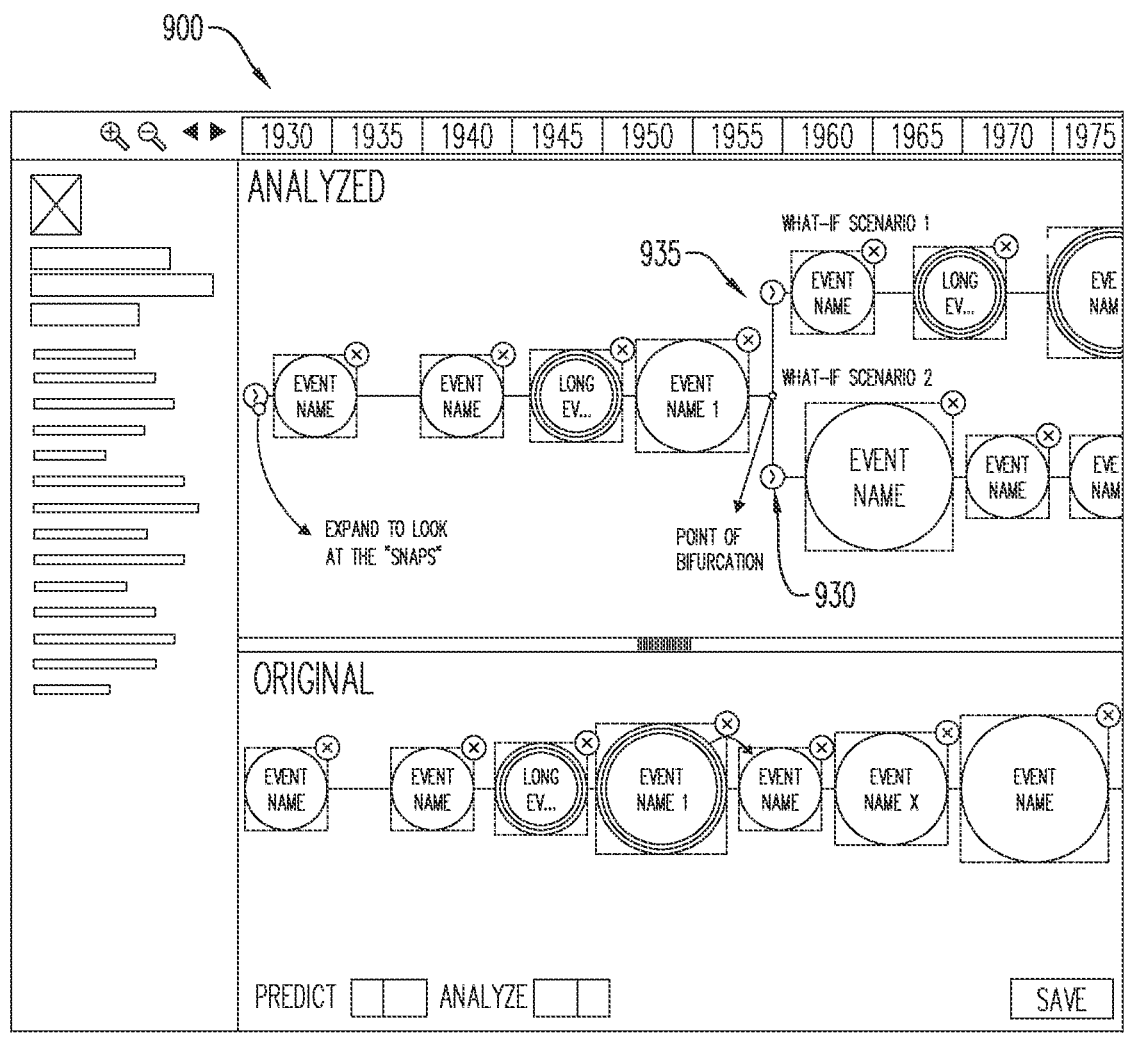
FIG. 11 illustrates analyzing an event path associated with a query results interface according to some embodiments.

Now referring to FIG. 10A, FIG. 10B, and FIG. 11, in some embodiments, once a user receives a time snap, the user may initiate an analyze function. The analyze function may provide options for a user to add, delete or reorganize events. In some embodiments, a user may graphically manipulate a time snap (e.g., adding, removing or repositioning an event) to change the time snap. For example, in FIG. 10A an event 925 may be added between two pictograms. A user may select a location to add an event and, in response, the time snap engine may provide suggestions of events for a user to add or a user may create an event to add as illustrated in FIG. 10B. Likewise, an event may be deleted or repositioned before or after existing events.

The user may also initiate a prediction feature. By considering all events of a particular time snap from the past until the present, and analyzing all the patterns learned by the time snap engine, the time snap engine may predict future events. The time snap engine then predicts future events based on learned patterns and displays a new time snap including the predicted future events.

As illustrated in FIG. 11, events may be split into multiple paths to illustrate different scenarios. For example, in FIG. 11 an event path is bifurcated and is illustrated with two new starting points 930/935 associated with two different scenarios. While two paths are illustrated, many different paths may be created to illustrate different scenarios.

Figure 11A:
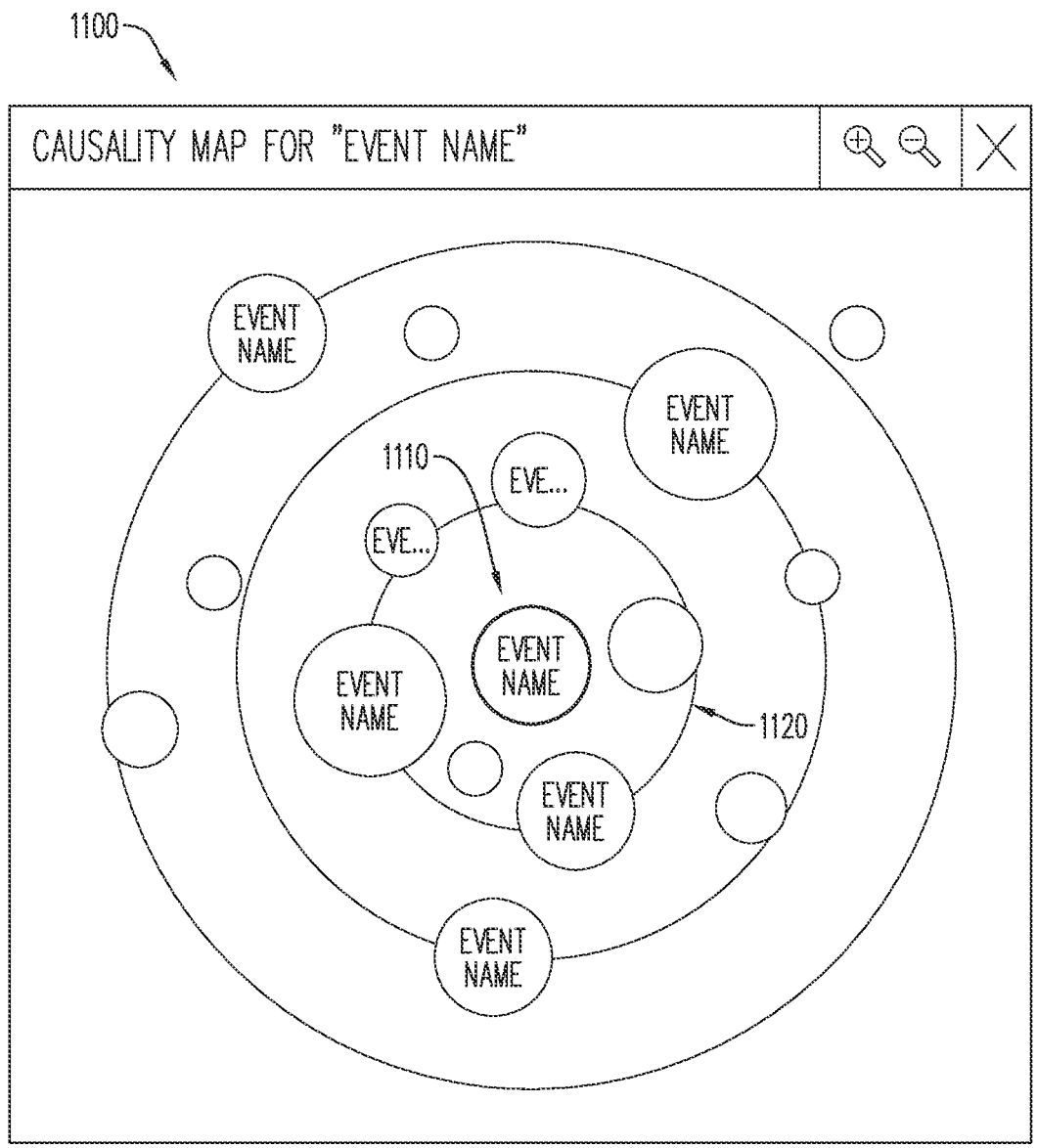
FIG. 11A illustrates a causality map according to some embodiments.

Now referring to FIG. 11A, an embodiment of a causality map 1100 is illustrated. In some embodiments, a user may select a pictogram from an event path and select an option to display a causality map associated with the event related to the pictogram. The event related to the pictogram may have causal relationships with other events and the causality map may display the other events in terms of causality with the selected event 1110. For example, the selected event 1110 of the causality map 1100 may have a causal relationship with each event circling the selected event 1110 where an inner most ring 1120 may comprise a highest level of causality while each outer ring may be progressively less causal.

Figure 12:
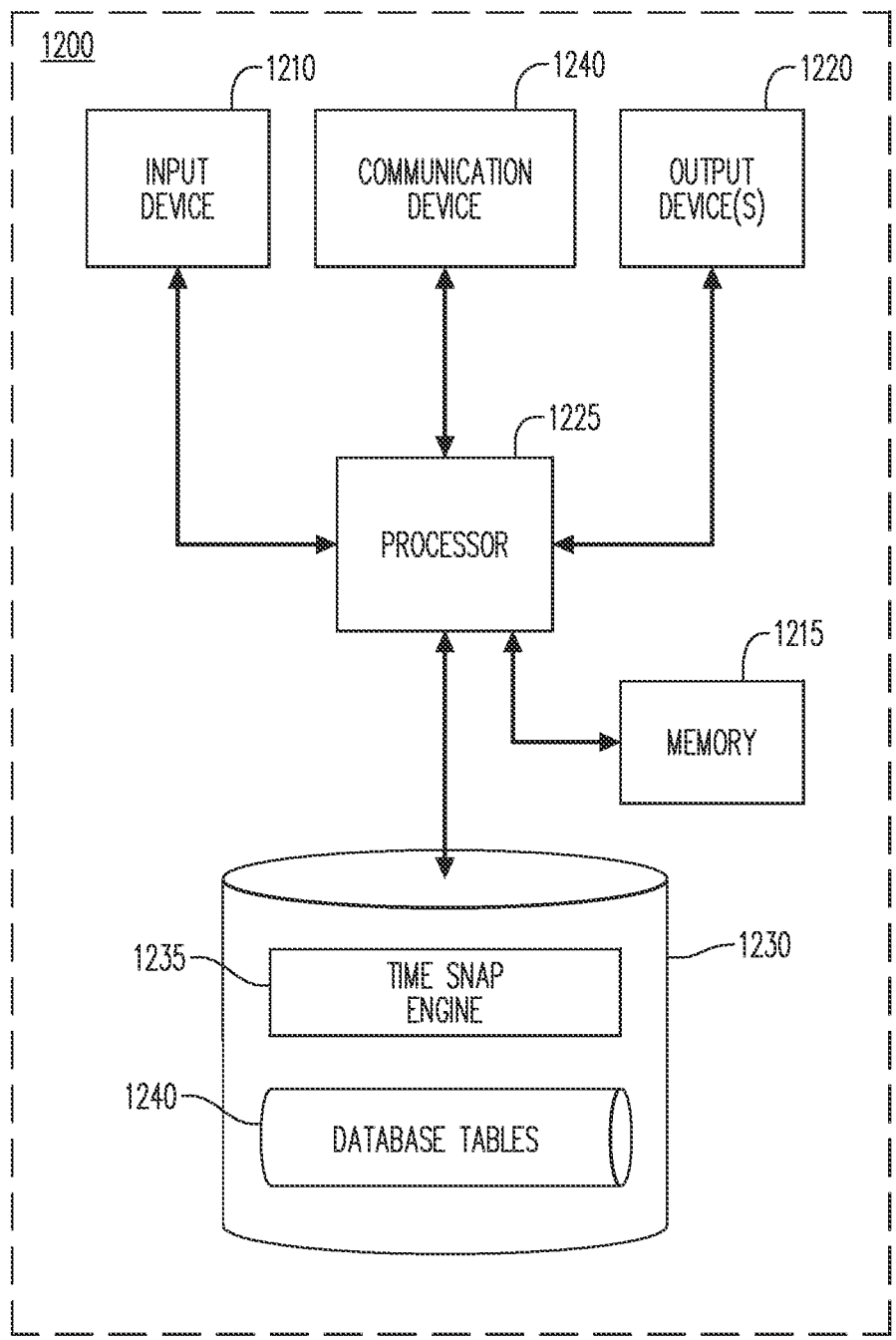
FIG. 12 is a block diagram of an apparatus according to some embodiments.

FIG. 12 is a block diagram of apparatus 1200 according to some embodiments. Apparatus 1200 may comprise an application server that executes program code to perform any of the processes described herein. Apparatus 1200 may include other unshown elements according to some embodiments.

Apparatus 1200 includes processor 1225 operatively coupled to memory 1215, data storage device 1230, an input device 1210, an output device 1220 and memory 1215. Communication device 1240 may facilitate communication with external devices, such as a reporting client, or a data storage device. Input device(s) 1210 may comprise, for example, a keyboard, a keypad, a mouse or other pointing device, a microphone, knob or a switch, an infra-red (IR) port, a docking station, and/or a touch screen. Input device 1210 may be used, for example, to enter information into apparatus 1200. Output device 1220 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Data storage device 1230 may comprise program code of time snap engine 1235 executed by processor 1225 to cause apparatus 1200 to perform any one or more of the processes described herein. Embodiments are not limited to execution of these processes by a single apparatus. Data storage device 1230 may also include one or more database tables 1240 for use with process 200. For example, the database tables 1240 may store information associated with time based search results. In some embodiments, a first database table may define fields related to specific events and categories such as a field for snippet text data, a field for categories, a field for uniform resource locators (URL), a field for source identification, a field for an event date associated with a snippet, a field for a selection frequency of snippets, and a field for a causal link indicator. A second table may define fields related to data sources such as a field for source identification, a field for a source name and a field for source relevance.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A method comprising:
   receiving, by an application server including a processor, a query relating to a subject to be searched;
   querying, by the application server, an information space based on the query;
   receiving, by the application server, results of the query of the information space determined to be related to the subject;
   associating, by the application server, each of the results with one of a plurality of categories, the plurality of categories being based on a context of the respective results or a predetermined list of categories;
   determining, by the application server, time periods associated with the results of the query, the determining of the time periods being based on a search of data within the information space, a date and a time associated with each of the results, semantics of words being searched, and a context associated with each of the results that describes a particular result in relation to other results of the query;
   associating, by the application server, each of the results with one of a plurality of groups, each group of the plurality of groups representing a respective one of the determined time periods;
   generating, by the application server, a set of pictograms representing each group of the plurality of groups representing a respective one of the determined time periods, each pictogram having a size representing a relevance of the results associated with the respective pictogram, the relevance of each of the results being based on a reliability of a source of the respective result; and
   displaying, within a query results interface based on the associated categories, determined time periods, and associated groups, the plurality of pictograms in a linear progression and in chronological order with respect to one another, pictograms associated with a same category being displayed as a set with the pictograms in each set within a respective category being presented in a linear progression and in chronological order with respect to one another, independently of the other categories.

2. The method of claim 1, further comprising:
   determining a most common phrase or term within each group of the plurality of groups; and
   labeling each pictogram with the most common phrase or term associated with the group represented by the pictogram, wherein the linear progression is a horizontal progression with respect to a display screen.

3. The method of claim 1, further comprising:
   receiving an indication of a cursor co-located with one of the plurality of pictograms; and
   in response to the indication, displaying information associated with the group that is represented by the one of the plurality of pictograms.

4. The method of claim 1, wherein the results comprise a plurality of snippets, each snippet of the plurality of snippets associated with a uniform resource locator ("URL"), the method further comprising:
   receiving an indication of a user selection of one of the plurality of pictograms; and
   in response to the indication, displaying the plurality of snippets and respective URLs associated with the group that is represented by the one of the plurality of pictograms.

5. The method of the claim 1, wherein a size of a first of the plurality of pictograms is based on a relevance of the results associated with the group that is represented by the first of the plurality of pictograms and a size of a second of the plurality of pictograms is based on a relevance of the results associated with the group that is represented by the second of the plurality of pictograms, wherein the first size is different from the second size.

6. The method of the claim 1, wherein a first of the plurality of pictograms is visually enhanced is based on an amount of the results associated with the group that is represented by the first of the plurality of pictograms.

7. The method of claim 1, further comprising:
   displaying a chronological indicator linking a first pictogram of the plurality of pictograms with a second pictogram of the plurality of pictograms.

8. The method of claim 1, further comprising:
   displaying a causal indicator linking a first pictogram of the plurality of pictograms with a second pictogram of the plurality of pictograms.

9. A system comprising:
   a processor; and
   a non-transitory computer-readable medium storing program code, the program code executable by a computer system to cause the computer system to:
   receive a query relating to a subject to be searched;
   query an information space based on the query;
   receive results of the query of the information space determined to be related to the subject;
   associate each of the results with one of a plurality of categories, the plurality of categories being based on a context of the respective results or a predetermined list of categories;
   determine time periods associated with the results of the query, the determining of the time periods being based on a search of data within the information space, a date and a time associated with each of the results, semantics of words being searched, and a context associated with each of the results that describes a particular result in relation to other results of the query;
   associate each of the results with one of a plurality of groups, each group of the plurality of groups representing a respective one of the determined time periods;
   generate a set of pictograms representing each group of the plurality of groups representing a respective one of the determined time periods, each pictogram having a size representing a relevance of the results associated with the respective pictogram, the relevance of each of the results being based on a reliability of a source of the respective result; and
   display, within a query results interface based on the associated categories, determined time periods, and associated groups, the plurality of pictograms in a linear progression and in chronological order with respect to one another, pictograms associated with a same category being displayed as a set with the pictograms in each set within a respective category being presented in a linear progression and in chronological order with respect to one another, independently of the other categories.

10. The system of claim 9, wherein the linear progression is a horizontal progression with respect to a display screen.

11. The system of claim 9, further comprising program code executable by a computer system to cause the computer system to:
receive an indication of a cursor co-located with one of the plurality of pictograms; and
in response to the indication, display information associated with the group that is represented by the one of the plurality of pictograms.

12. The system of claim 9, wherein the results comprise a plurality of snippets, each snippet of the plurality of snippets associated with a uniform resource locator ("URL") and further comprising program code executable by a computer system to cause the computer system to:
receive an indication of a user selection of one of the plurality of pictograms; and
in response to the indication, display the plurality of snippets and respective URLs being represented by the one of the plurality of pictograms.

13. The system of the claim 9, wherein a size of a first of the plurality of pictograms is based on a relevance of the results being represented by the first of the plurality of pictograms and a size of a second of the plurality of pictograms is based on a relevance of the results being represented by the second of the plurality of pictograms, wherein the first size is different from the second size.

14. The system of the claim 9, wherein a first of the plurality of pictograms is visually enhanced is based on an amount of the results associated with the group that is represented by the first of the plurality of pictograms.

15. The system of claim 9, further comprising program code executable by a computer system to cause the computer system to:
display a chronological indicator linking a first pictogram of the plurality of pictograms with a second pictogram of the plurality of pictograms.

16. The system of claim 9, further comprising program code executable by a computer system to cause the computer system to:
display a causal indicator linking a first pictogram of the plurality of pictograms with a second pictogram of the plurality of pictograms.

17. The system of claim 9, further comprising program code executable by a computer system to cause the computer system to:
display a chronological indicator linking a first pictogram of the plurality of pictograms with a second pictogram of the plurality of pictograms; and
display a causal indicator linking the second pictogram of the plurality of pictograms with a third pictogram of the plurality of pictograms.

18. A non-transitory computer-readable medium storing program code, the program code executable by a computer system to cause the computer system to:
receive a query relating to a subject to be searched;
query an information space based on the query;
receive results of the query of the information space determined to be related to the subject;
associate each of the results with one of a plurality of categories, the plurality of categories being based on a context of the respective results or a predetermined list of categories;
determine time periods associated with the results of the query, the determining of the time periods being based on a search of data within the information space, a date and a time associated with each of the results, semantics of words being searched, and a context associated with each of the results that describes a particular result in relation to other results of the query;
associate each of the results with one of a plurality of groups, each group of the plurality of groups representing a respective one of the determined time periods;
generate a set of pictograms representing each group of the plurality of groups representing a respective one of the determined time periods, each pictogram having a size representing a relevance of the results associated with the respective pictogram, the relevance of each of the results being based on a reliability of a source of the respective result; and
display, within a query results interface based on the associated categories, determined time periods, and associated groups, the plurality of pictograms in a horizontal linear progression and in chronological order with respect to one another, pictograms associated with a same category being displayed as a set with the pictograms in each set within a respective category being presented in a linear progression and in chronological order with respect to one another, independently of the other categories.

19. The medium of the claim 18, wherein a size of a first of the plurality of pictograms is based on a relevance of the results being represented by the first of the plurality of pictograms and a size of a second of the plurality of pictograms is based on a relevance of the results being represented by the second of the plurality of pictograms, wherein the first size is different from the second size.

20. The medium of the claim 18, wherein a first of the plurality of pictograms is visually enhanced is based on an amount of the results associated with the group that is represented by the first of the plurality of pictograms.

* * * * *